A. J. HALL.
CONTROL APPARATUS.
APPLICATION FILED DEC. 1, 1916.

1,277,409.

Patented Sept. 3, 1918.
2 SHEETS—SHEET 2.

WITNESSES:
R. J. Ridge.
W. R. Coley.

INVENTOR
Arthur J. Hall.
BY
Wesley G. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,277,409.  Specification of Letters Patent.  Patented Sept. 3, 1918.

Application filed December 1, 1916. Serial No. 134,304.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Apparatus, of which the following is a specification.

My invention relates to control apparatus and especially to certain structural features of liquid rheostats and the like.

One object of my invention is to provide a tubular discharge valve for liquid rheostats having certain internal and external surfaces shaped to conform to the natural curve of liquid being discharged through a horizontal orifice, whereby a maximum outflow of liquid may be obtained.

Another object of my invention is to provide a liquid rheostat having a discharge valve, power-actuated means, such as a pneumatic cylinder and pistons, for operating the valve, and means associated with the valve for completing the travel thereof just prior to the completion of the corresponding movement of the power-actuated means, whereby all injurious shock is removed from the latter and from the mechanically driven parts, such as a meshing rack and pinion.

A further object of my invention is to provide actuating means for discharge valves of the type under consideration which shall be relatively simple in construction and effective and reliable in operation and which, in particular, shall act to reduce the necessary "head-room", or vertical operating space requirements, of the valve for varying the active level of the electrolyte.

Figure 1:
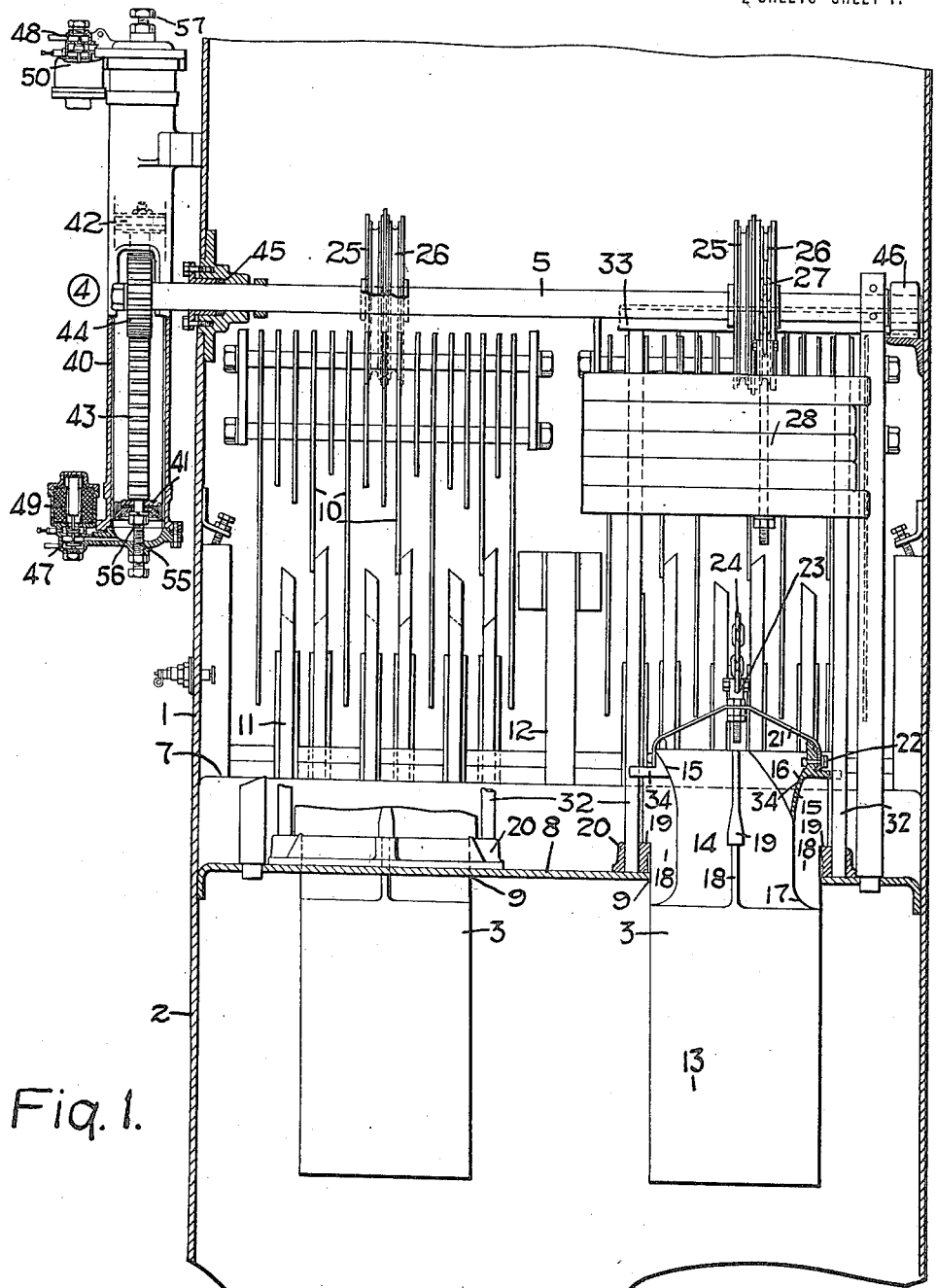
Figure 2:
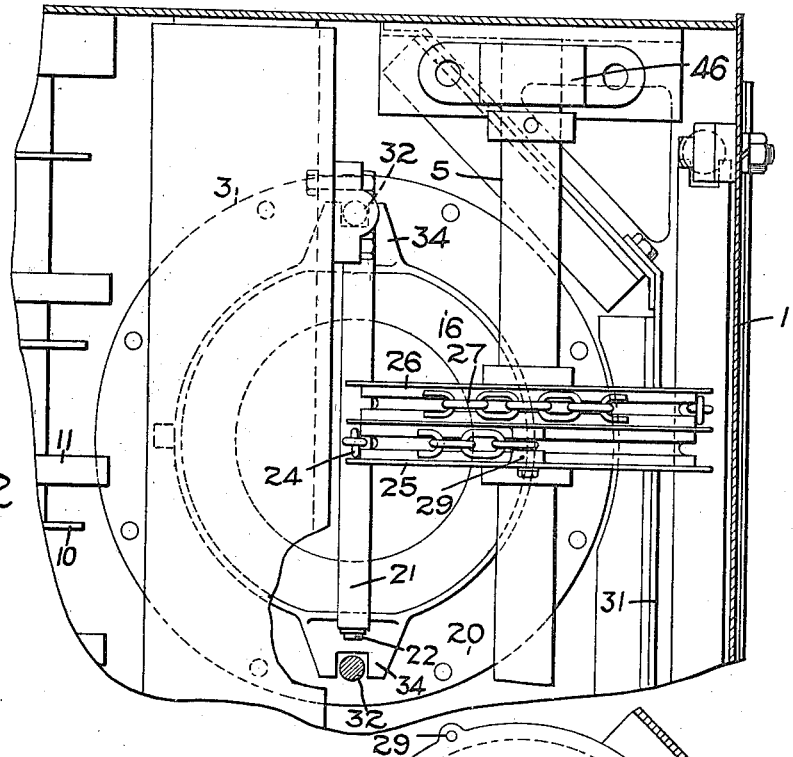
Figure 3:
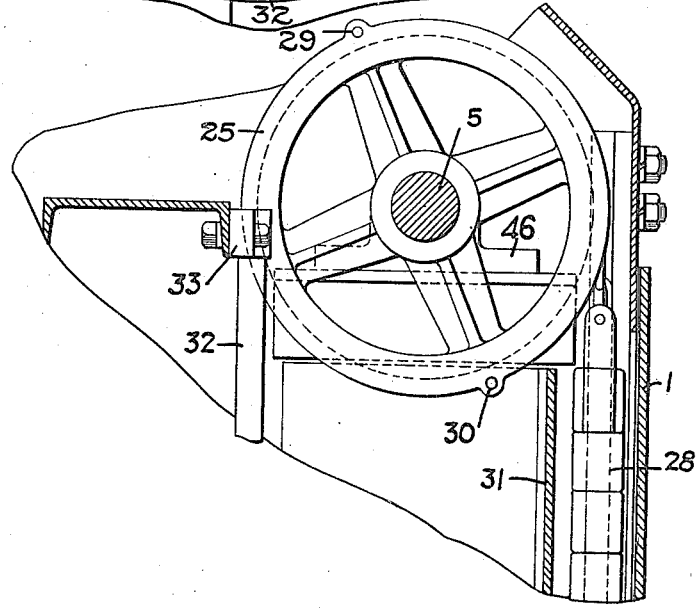

My invention may best be understood by reference to the accompanying drawings, wherein Figure 1 is a view, chiefly in section but partially in elevation, of a liquid rheostat constructed in accordance with my present invention; Fig. 2 is a fragmentary plan view of a portion of the apparatus that is shown in Fig. 1; and Fig. 3 is a similar view, in side elevation, of certain of the apparatus that is illustrated in Fig. 2.

Referring to the drawings, the structure shown comprises a suitable liquid rheostat having an electrode-containing tank 1 and a bottom reservoir compartment 2; a plurality of tubular discharge valves 3 for fixing the level of the electrolyte in the tank 1 and for discharging the surplus liquid into the reservoir 2; and a power-actuated mechanism 4 for operating the discharge valves, in the desired manner, through the agency of a rotatable horizontally-located shaft 5.

The tank 1 may be of any suitable type, being shown as having a main floor 7, and a depressed portion or well 8 that is provided with a plurality of bottom discharge openings 9. Suitable electrodes 10 and preferably non-conducting barriers or baffle-plates 11 that extend upwardly from the tank floor 7 are also provided. For further description of such construction, reference may be had to my co-pending application, Serial No. 138,004, filed Dec. 20, 1916, and to another co-pending application of A. J. Hall and C. C. Whittaker, Serial No. 136,033, filed Dec. 9, 1916.

The original discharge valve of the type herein illustrated is set forth and claimed in my co-pending application, Serial No. 873,919, filed Nov. 25, 1914, which discloses a tubular valve having an upper cylindrical portion of smaller diameter than the lower cylindrical portion that is adapted to slidingly fit the discharge opening in the bottom of the electrode-containing tank. However, it was found that the outflowing stream tended to become constricted in the center of the valve so that the most effective use of valve material did not obtain, and, not only was it necessary to build the valves of relatively large diameters to accommodate a certain volume of liquid discharge, but also the vertical movement necessary to raise the height of the electrolyte in the electrode-containing tank, particularly from the fully discharged or normal level to the "flush-level," wherein the electrode tips are just immersed, was comparatively great. By the use of the peculiarly constructed valve of my present invention, a maximum discharge of liquid, both around the outside of the valve when occupying its lowest or normal position and also through the valve when occupying any of its active positions above "flush-level," to thereby fix the height of the electrolyte, is obtained.

In general, the external and internal surfaces that come in direct contact with the outflowing liquid are shaped to conform to the natural curve of the liquid during an unrestricted discharge through a horizontal orifice, thereby obtaining the above-mentioned desirable results of maximum discharge of liquid at all times, for a given size and weight of valve, and also a reduction in the necessary "head-room."

The valve 3 comprises a lower cylindrical portion 13 of substantially the same diameter as the bottom opening 9 of the tank 1 and an upper portion 14 having the outer surface 15 and the inner surface 16 of the lips forming the upper end of the valve shaped to substantially conform to the above-mentioned natural curve of falling liquid. Furthermore, the curve 17 constituting the juncture of the lower and upper portions 13 and 14, respectively, of the valve is also similarly shaped.

The upper curved portion 14 of the valve is provided with a plurality of external radially-extending ribs 18 that severally have projections or shoulders 19 normally resting upon a stationary annular stop member 20 that is located in the tank bottom around the opening 9 and thus serves as a dam to collect debris and prevent clogging of the discharge valve.

Since the lower portion 13 of the valve normally occupies the illustrated position, wherein the curved juncture-surface 17 is located just below the bottom opening 9 of the tank 1, it follows that a relatively great annular discharge area obtains between the edges of the bottom opening 9 and the upper portion 14 of the valve, thereby permitting a relatively great normal discharge of liquid around the valve and into the reservoir below. It will be understood that the advantages of the present phase of my invention may be attained in the highest degree by proportioning the coöperating parts of the valve as indicated in the drawings, namely, so that the circular discharge area inclosed by the walls of the upper valve portion 14 in a plane of the tank discharge opening 9 substantially equals the annular discharge area that is included between those walls and the edges of that opening in the same plane.

A bent strap member 21 extends across and above the upper portion 14 of the discharge valve to which it may be secured by means of suitable bolts 22, or otherwise. A swivel-block 23, or an equivalent device, is secured to the middle portion of the strap member 21, and a chain 24 has its lower end attached to the swivel-block 23, while its upper end passes over a sheave 25 that is rigidly fastened upon the rotatable shaft 5. A similar sheave 26 is located adjacent to the sheave 25, and a second chain 27 passes over the sheave 26 and has its free end suitably secured to a counter-weight 28 for the discharge valve 3, whereby a minimum amount of energy is required to actuate the valves, as will be understood.

Although, in the present case, two discharge valves are shown as governed by the actuation of the shaft 5, it will be appreciated that a single valve, or any other desired number, may be employed.

The chain 25 has its upper end pivotally secured to a suitable anchor-block 29 of the sheave 25, while the upper end of the other chain 27 is similarly attached to a block 30 that is located substantially 180 degrees from the first-mentioned block 29.

The use of two simultaneously actuated, but independently secured, valve chains 24 and 27 serves to effectively prevent slipping, which is liable to occur where a single chain or cable and sheave is employed. It will be appreciated, without detailed description, that the chain or cable type of actuating mechanism inherently requires less vertical operating space or "head-room" than an equivalent vertical rod or rack type.

A suitable partition member 31 extends across the tank 1, near one vertical wall thereof, to form an appropriate compartment for housing the counterweight 28 in its upward and downward travel. For the purpose of suitably guiding the vertical movements of the discharge valve 3, since the chain 24 cannot, of course, perform this function, a plurality of vertical rods or posts 32 have their lower ends secured within the stationary stop or ring member 20 and their upper ends suitably secured to the adjacent portions 33 of the liquid rheostat frame-work. The upper end of the discharge valve 3 is provided with a plurality of forked ears or projections 34 which partially surround the rods or posts 32 and thus effect the proper guidance of the valve throughout its range of travel.

The power-actuated mechanism 4 is of a familiar electrically-controlled, pneumatically-operated type and comprises a casing or cylinder 40 within which a pair of pistons 41 and 42, that are joined by a rack member 43, are adapted to travel. A pinion 44, that is secured to one end of the horizontal shaft 5, meshes with the rack member 43 to effect corresponding movement of the discharge valve through the shaft 5, the sheave 25 and the chain 24.

Suitable supporting bearings 45 and 46 for the respective ends of the shaft 5 are provided near the sides of the rheostat.

The lower and the upper ends of the operating cylinder 40 are adapted to be placed in communication with a source of fluid pressure (not shown), under predetermined conditions, through the agency of valve members 47 and 48, respectively, which, in turn, are respectively controlled by electrical actuating coils 49 and 50. The valve member 48 is normally held open, as illustrated, to admit fluid pressure to the upper end of the operating cylinder 40, whereby the pistons 42 and 41 are biased to the illustrated or lowest position, since the other valve member 47 is normally closed to prevent the access of fluid pressure to the lower end of the cylinder.

Assuming that the parts of the operating mechanism 4 occupy the respective illustrated positions, and that it is desired to effect actuation of the valve member 3, such operation may be described as follows: Upon concurrent energization of the actuating coils 49 and 50 for the mechanism 4, fluid pressure is admitted to the lower end, and is exhausted from the upper end, of the cylinder 40 by reason of the reversal in position of the valve members 47 and 48. Consequently, the pistons are actuated upwardly to correspondingly raise the valve member 3 and lower the counterweight 28. To arrest such upward movement at any time, it is merely necessary to deënergize the coil 50, whereupon fluid pressure is again admitted to the upper end of the cylinder 40, and balanced-pressure conditions exist in the mechanism to thus effect a positive and reliable stoppage thereof. To effect the return movement of the actuating mechanism to the illustrated position, the actuating coils 49 and 50 are deënergized, thereby causing the fluid-pressure conditions to revert to the original state and, consequently, cause the downward movement of the pistons to the position shown.

Only a brief description of the operation of the discharge valve 3, with respect to varying the height of the electrolyte in the tank 1, will be necessary. Normally, that is, when the valve occupies the illustrated position, a continuous volume of electrolyte from the inlet (not shown), at the end of the tank remote from the discharge valves 3, flows over the tank floor 7 to the depression or well 8 containing the bottom openings 9, and the liquid is discharged into the bottom reservoir 2 by reason of the relatively large annular aperture between the edges of the bottom opening 9 and the upper portion 14 of the valve.

Upon actuation of the valve, in the previously-described manner, to a point where the lower cylindrical portion 13 just enters the bottom opening 9, the liquid level rapidly rises to the upper edge of the valve member, whereby the electrode tips are just immersed, and is then discharged, over the curved internal surface 16, through the valve to the bottom reservoir.

By reason of the design and arrangement of parts of the valve portions, a relatively great discharge of liquid is permitted around the valve when occupying the normal illustrated or inactive position, while a correspondingly great outflow of electrolyte is permitted through the valve when it occupies any of its active positions above "flush-level."

Since a maximum discharge of liquid thus occurs during the inactive operation of the rheostat, it follows that the height of liquid above the floors of the tank is relatively small, as compared with the height that obtained in the use of prior cylindrical valve members and, consequently, a certain decrease in the necessary "head-room" or space required for vertical movement from the normal to the "flush-level" position of the discharge valve is secured, in addition to the total reduction that is effected by the use of the chain-and-sheave arrangement, as previously pointed out.

It will be appreciated that, at the end of the relatively rapid downward movement of the pistons 41 and 42, some means should be provided for removing shock therefrom and also from the other parts that are mechanically connected in substantially rigid relation. For this purpose, the lower end of the operating cylinder 40 is provided with an externally adjustable bolt 55 which engages the securing bolt member 56 of the piston 41. By suitably adjusting the position of the bolt 55, the shoulders 19 of the discharge-valve rib members 18 may be caused to engage the stop member 20 at the completion of the travel of the valve, just prior to the completion of the downward stroke of the piston member, thereby precluding any possibility of injurious shock to the latter. As an additional protection, the links of the chain 24 are valuable in that the shock is absorbed thereby, and no rebounding of the valve occurs. Such protection of the pistons 41 and 42 is not necessary at the upper end of their travel, since the upward movement of the pistons is relatively slow.

Another bolt 57 is provided in the upper end of the cylinder 40 for determining the upper limit of piston travel, and, therefore, the maximum liquid level in the tank 1.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. A tubular discharge valve for liquid rheostats having an internal and an external surface shaped to conform to the natural curve of liquid being discharged through a horizontal orifice, and an external discharge opening normally surrounding said valve in a plane that provides a maximum horizontal distance between the valve walls and the edges of said opening, whereby a maximum internal and external outflow of liquid may be obtained.

2. A tubular discharge valve for liquid rheostats comprising a lower portion of substantially cylindrical form to fit a discharge opening, and an upper portion of less average diameter and having internal and external surfaces shaped to conform to the natural curve of liquid being discharged through a horizontal orifice, said opening normally surrounding said upper portion in the plane of a short diameter thereof.

3. A tubular discharge valve for liquid rheostats comprising a lower portion of substantially cylindrical form to fit a discharge opening, and an upper portion having internal and external surfaces shaped to conform to the natural curve of liquid being discharged through a horizontal orifice and a similar curved external surface at the juncture of the lower and upper portions of the valve.

4. The combination with a tank having a bottom opening, of a tubular discharge valve associated therewith and comprising a lower portion of substantially cylindrical form to fill said bottom opening under predetermined conditions, an upper portion having internal and external surfaces shaped to conform to the natural curve of liquid being discharged through a horizontal orifice and a similar curved external surface at the juncture of said lower and upper portions, and means for normally positioning the valve with the last-mentioned curved external surface just below the bottom opening of the tank to permit the maximum discharge around the valve, and means for raising said cylindrical lower portion to fill the bottom opening, whereby the maximum discharge through the valve obtains.

5. In a liquid rheostat, the combination with a tank having a bottom opening, of a discharge valve adapted to operate within said opening, power-actuated means for operating said valve, and means acting in conjunction with the valve for causing the valve to complete its travel just prior to the completion of the downward movement of said power-actuated means to relieve the latter of any shock.

6. In a liquid rheostat, the combination with a tank having a bottom opening, of a discharge valve adapted to operate within said opening, pneumatically-actuated means for operating said valve, and a stationary stop member for engaging a portion of the valve to complete the travel thereof just prior to the completion of the downward movement of said pneumatically-actuated means.

7. In a liquid rheostat, the combination with a tank having a bottom opening, of a discharge valve adapted to operate within said opening, a chain attached to said valve, a rotatable shaft for actuating said chain, a piston member pneumatically operated to effect rotative movement of said shaft, and a stationary member located near said bottom tank opening to engage projections of said valve to complete the downward travel thereof just prior to the completion of the downward movement of said piston member.

8. The combination with a tank having a bottom opening constituting a valve seat, of a tubular discharge valve comprising a lower cylindrical portion proportioned to fill said bottom opening upon a predetermined upward valve movement, an upper portion having internal and external surfaces shaped to conform to the natural curve of liquid being discharged through a horizontal orifice and a similar curved external surface at the juncture of said lower and upper portions, and means for normally positioning the valve upon said seat to provide a maximum horizontal distance between the walls of the curved upper valve portion and said seat.

In testimony whereof I have hereunto subscribed my name this 24th day of Nov., 1916.

ARTHUR J. HALL.

Copies of this patent may be obtained for five cents each, by addressing the "Commissioner of Patents, Washington, D. C."